(12) United States Patent
Kukreja

(10) Patent No.: US 6,173,325 B1
(45) Date of Patent: Jan. 9, 2001

(54) METHOD COMPUTER PROGRAM PRODUCT, AND SYSTEM FOR ASSESSING THE PERFORMANCE OF A PACKET SCHEDULE

(75) Inventor: Sachin Kukreja, Bellevue, WA (US)

(73) Assignee: Microsoft Corporation, Redmond, WA (US)

(*) Notice: Under 35 U.S.C. 154(b), the term of this patent shall be extended for 0 days.

(21) Appl. No.: 09/127,236

(22) Filed: Jul. 31, 1998

(51) Int. Cl.$^7$ .............................. G06F 15/173; G06F 17/00
(52) U.S. Cl. .......................... 709/224; 709/223; 709/225
(58) Field of Search ................................ 709/204, 224, 709/223, 225, 226, 229, 201; 370/912, 952, 253; 713/201, 164; 714/12, 43; 707/10, 104

(56) References Cited

U.S. PATENT DOCUMENTS

| | | | |
|---|---|---|---|
| 5,247,517 | * 9/1993 | Ross et al. | 370/452 |
| 5,521,907 | * 5/1996 | Ennis, Jr. et al. | 370/253 |
| 5,590,116 | * 12/1996 | Zhang | 370/253 |
| 5,787,253 | * 7/1998 | Mc Creery et al. | 370/452 |
| 5,878,420 | * 7/1999 | De La Salle | 707/10 |
| 5,923,673 | * 7/1999 | Henrikson | 714/712 |
| 5,933,602 | * 8/1999 | Grover | 709/224 |
| 6,085,243 | * 7/2000 | Fletcher et al. | 709/224 |

* cited by examiner

Primary Examiner—Dung C. Dinh
Assistant Examiner—Abdullahi E. Salad
(74) Attorney, Agent, or Firm—Workman, Nydegger & Seeley

(57) ABSTRACT

In shared media communication systems, such as an Ethernet network, certain quality of service guarantees, such as a bandwidth "reservation," are negotiated between a source node, a destination node, and every intervening node that will facilitate the transport of a packet. A packet scheduler insures that a node operates in accordance with the previously negotiated resource guarantee. In order to test the performance of a packet scheduler, a capture of packets is started, and while the capture is proceeding, intermittent triggering packets are inserted into the capture. After terminating the capture, the extensible network monitoring software will analyze the packets and transfer interpretative control to extensible modules, such as a DLL, based on packet type. When a special triggering packet is encountered, the corresponding triggering DLL is called and will access a file defining the various packet flows of interest. Each packet will be analyzed until the next triggering packet is encountered and the performance statistics will be summarized on a per-flow basis using the extensible network monitoring software interface to display such statistics on a user interface.

15 Claims, 3 Drawing Sheets

METHOD COMPUTER PROGRAM PRODUCT, AND SYSTEM FOR ASSESSING THE PERFORMANCE OF A PACKET SCHEDULE

BACKGROUND OF THE INVENTION

1. The Field of the Invention

The field of the present invention is the area of software and hardware tools for monitoring and assessing performance of computer networks. More specifically, the present invention relates to such tools that allow the testing of a packet scheduler for conformance to a bandwidth reservation assigned to a particular packet flow.

2. Present State of the Art

Over time, the usefulness and benefits of stand alone computing devices, such as the ubiquitous personal computer, have been leveraged by allowing many of such computing devices to communicate one with another over a communications network. Network communication between computers allows many different kinds of applications to exist that are otherwise not possible with a stand alone computing device.

For communicating over a network, information that is to be transported from one computer to another is divided into a number of network communication packets. These network packets (also known simply as "packets") will eventually be transported across physical communications network. In the PC environment, transmission is handled by a network interface card residing in the personal computer. The network interface card acts as an interface in many instances with shared network media, such as an Ethernet network. Shared media, such as Ethernet, are characterized by all "nodes" on the media being able to transmit and receive packets over the common media. Origin and destination resolution is accomplished by addressing within the packet itself so that only the pertinent nodes will actually use the packet (though all nodes could read, retransmit, etc. any packet placed on the shared media). Furthermore, the PC environment will be assumed, though the discussion and application of the concepts apply to many different network computing environments as will be appreciated by those skilled in the art.

Initially, simple file transfers and messaging, such as e-mail, between networked computers constituted one major form of useful applications. Delays due to network traffic had little impact on the quality of service for such applications since a relatively long delay could be sustained without irritation on the part of the end user.

Currently, multimedia applications will have streaming data that is communicated from one computer to another such as successive sound or video frames. Such streaming data must be processed on a rate basis at the destination node and that same rate should be maintained for packet delivery over the network connection. Streaming data typically refers to a continuous set of successive packets that, in order to be processed correctly at the receiving computer, must have certain guaranteed transmission characteristics.

In other words, the packets should be sent at a certain rate with a certain limitation on the amount of variability between when successive packets are sent. Otherwise, packets will not be received and processed appropriately by the receiving computer and perceptible errors occur from the perspective of the end user. For example, a video frame may be lost or temporarily frozen if there is some sort of interruption in the stream of packets being processed.

In order to assure a certain quality of service, reservation of network bandwidth or other relevant resource is required. A number of different protocols have been developed, such as RSVP, ATM, etc., for making bandwidth reservations on all nodes that would be in charge of carrying network communication packets between the source and destination nodes. In this manner, once the bandwidth reservations are made, the packets may be sent as part of a data stream from the source node to the destination node with the assurance that a certain quality of service will result due to the bandwidth reservation.

When a packet data stream is associated with some form of resource guarantee or allocation, such as a bandwidth reservation, it is said to be a packet flow. In order to meet the service requirements for a data stream one or more packet flows can be established between the networked nodes. Packets are scheduled for delivery onto the communications network from the origination node based on the data stream's quality of service requirements. A "packet scheduler" refers to the functionality at a node, typically an origination node, used to place packets from a flow onto the shared media, such as a network through the network interface card and associated software. One example of a packet scheduler or sequencer is disclosed in co-pending U.S. patent application Ser. No. 09/094,045 filed on Jun. 9, 1998, and is hereby incorporated by reference.

A live audio-video connection that is sent over the Internet or other packet switching network is an example of a data stream having quality of service requirements. Such an audiovisual data stream may occur as part of a videotelephone and would require that the information be delivered quickly and without too much delay so that quality pictures and sound could be perceived by the end user. When quality of service requirements are not met in such an application, a jerky or frozen image may result or the picture and sound may appear too unnatural for interaction due to delay.

A more "real world" example of bandwidth reservation and quality of service may be seen in the use of High Occupancy Vehicle ("HOV") lanes on metropolitan freeways. For specific times, typically corresponding to rush hour commuter traffic, an HOV lane is "reserved" for vehicles having two, three, or more passengers. The "reservation" is dropped outside those times and provides a certain "quality of service" to the passengers within a qualifying vehicle so that they may commute more quickly during high traffic times.

With respect to a packet scheduler that is responsible for placing packets onto the shared media network, packets are only introduced insomuch as they allow the bandwidth reservations previously made for particular packet flows to be met. It becomes important to test whether a packet scheduler is performing as designed as well as gathering other network packet performance data.

Network monitoring occurs when all packets going over the network are monitored or stored by a particular node, not just the packet destined for or originating from the node. This allows network traffic rates to be quantified and other useful information to be gathered.

Some network monitoring systems, such as Netmon provided by Microsoft, are highly sophisticated and extensible. Netmon allows custom Dynamic Link Libraries ("DLLs") for individual packet types to be written that allow customized information about a packet to be displayed. Extensibility allows flexibility in that different packet types may be easily added into a network monitoring software system.

One known way to monitor network traffic from a given node entails doing a "capture" on all packets available over the shared media for a particular time period (e.g., 15 seconds, 1 minute, etc.). The capture is stored on disk or other storage and is then analyzed after the capture is taken. Statistics can be calculated, such percent utilization of the media, and other relevant characteristics ascertained. Such statistics are not normally done on a per-flow basis as would be necessary to test the performance of a packet scheduler against the previous reservation of bandwidth.

SUMMARY AND OBJECTS OF THE INVENTION

It is an object of the present invention to test the performance of a packet scheduler by measuring relevant statistics, such as percentage of total bandwidth taken, on a per-flow basis to see whether the packet scheduler is properly honoring a bandwidth "reservation" for a given flow.

It is another object of the present invention to do per-flow performance measurements using existing extensible tools thereby allowing capitalization of the familiarity regarding the operation of the tool.

It is a feature of the present invention to insert special triggering packets into a capture so that processing control is transferred to a performance measuring module that will make all the performance calculations.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method, computer program product, and system for assessing the performance of a packet scheduler is provided.

The present invention is written to take advantage of existing network performance monitoring tools that are extensible, such as Netmon. The invention adds to Netmon the ability to get detailed statistics on the specific operation of a Packet Scheduler. When Netmon is started, it captures all packets sent on the network for a given time frame. The invention uses a software component to insert special trigger packets into a running capture. The trigger packets are inserted at a fixed time interval, so there is a constant time difference between inserted trigger packets.

After the capture is terminated, when the extensible network monitoring software, such as Netmon, encounters an inserted trigger packet, it transfers control to a separate DLL for handling that type of packet (e.g., a trigger packet). This is the same mechanism used for interpreting other "normal" types of packets that might be found in the capture and is used in this instance to transfer control to software for tabulating statistics.

Without using the trigger packets to pass control to a software component (e.g., the trigger packet DLL also known as a performance measuring DLL) that can do the specific processing for gathering and tabulating the relevant statistics on a per-flow basis, a network monitoring software program, such as Netmon, would be unable to provide such useful functionality. The addition of the software component written to the provided interface for extensibility found on the extensible network monitoring software program allows a standard tool to be "customized" so that it is suited for measuring the performance of a packet scheduler.

The trigger packet DLL is designed to evaluate all packets between the current inserted trigger packet and the next inserted trigger packet. The trigger packet DLL will decode relevant information in the packets in order to collect the desired statistical information. This statistical information provides a measure on how well the packet scheduler is working.

The trigger packet DLL accepts the flows of interest as an input. This input is taken, in one embodiment, from a special storage file that lists the flows of interest in the format of an IP address and an associated port on the host system. The statistics that are collected then summarize information by individual flows of interest so that the performance of a packet scheduler for each flow can be identified. Besides summarizing statistics on a per-flow basis, the trigger packet DLL will summarize statistics on a "block" basis for the period of time represented by the frequency of the inserted trigger packets.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

As used herein, the term "quality of service" refers to the quality of data stream processing such that high quality is perceived by the end user. Service requirements may require a resource reservation, such as a share of the network bandwidth, as well as absolute or statistical guarantees on relevant metrics pertaining to packet delivery and processing, such as maximum latency, maximum variability of latency, minimum reliability of delivery, etc.

As used herein, the term "packet flow" or "flow" refers to a sequential stream of packets and an accompanying reservation of resources, such as network bandwidth.

As used herein, the term "shared media" refers to a communications media where every node attached to the media is able to "hear" or otherwise be aware of everything that is passed over the media. A typical example used throughout of a shared communications media is the Ethernet standard for network communications.

As used herein, the term "triggering packet" refers to a block of data formatted to appear as a normal transmission packet and having a unique packet type. Note that the packet is not necessarily designed to be transmitted over the shared media but simply as a unique placeholder within a capture so that it may be used to pass control to a specific triggering software module that gets called when the triggering packet type is encountered.

As used herein, the term "triggering software module" refers to an extensible module used with an extensible network monitoring software program that receives processing control when a triggering packet is encountered. In this module lies the main functionality for collecting and gathering statistics on a per-flow basis in order to determine the performance and operation sufficiency of a packet scheduler. This module will also cause the statistics to be displayed either directly or indirectly through a provided interface of the extensible network monitoring software.

Figure 1:
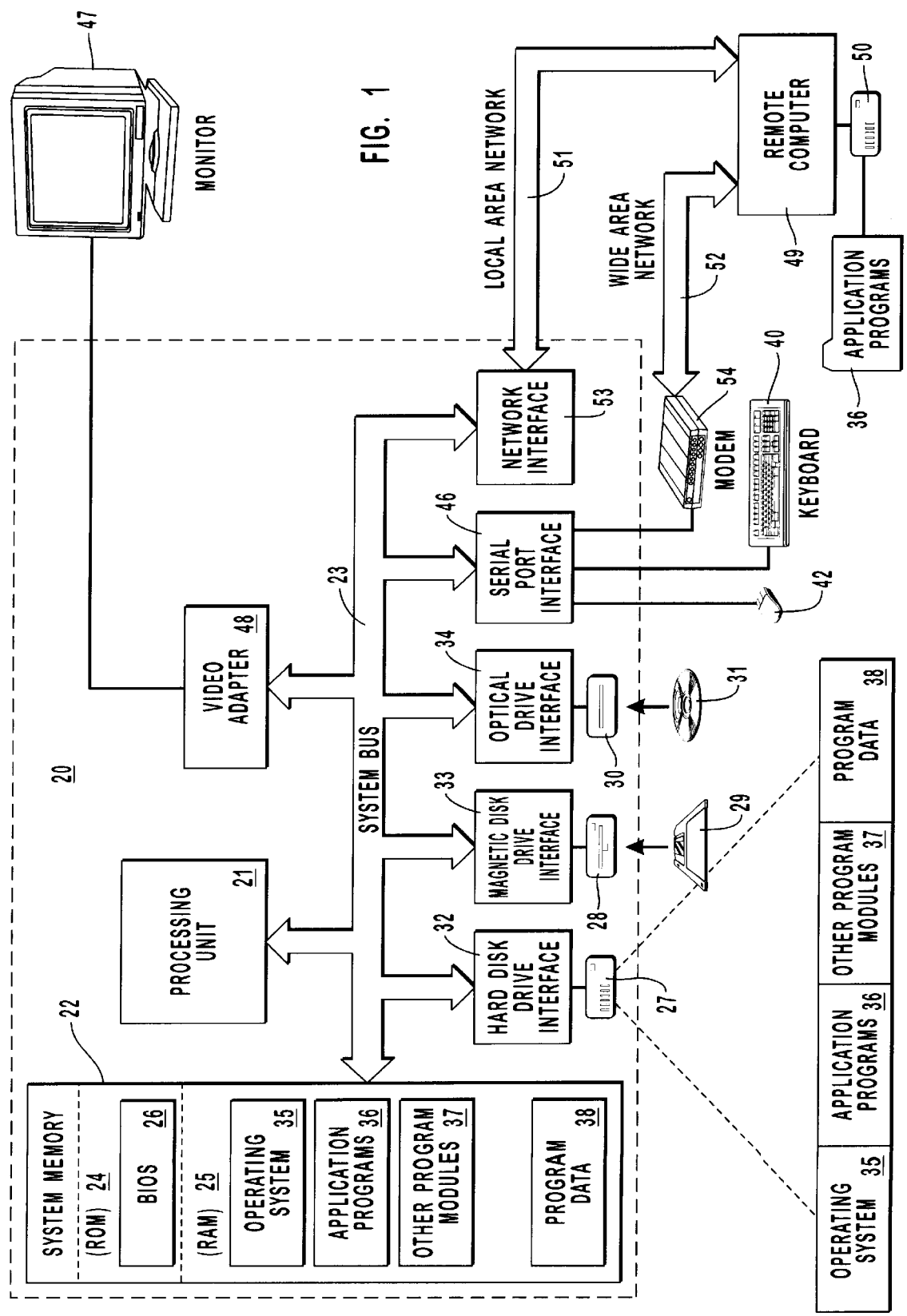
FIG. 1 is a block diagram of an exemplary system for implementing the present invention that includes a general purpose computing device in the form of a conventional personal computer.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. the system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices enterprise-wide computer networks, intranets and the Internet.

When used in a LAN networking environment, the personal computer 20 is connected to the local network 51 through a network or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
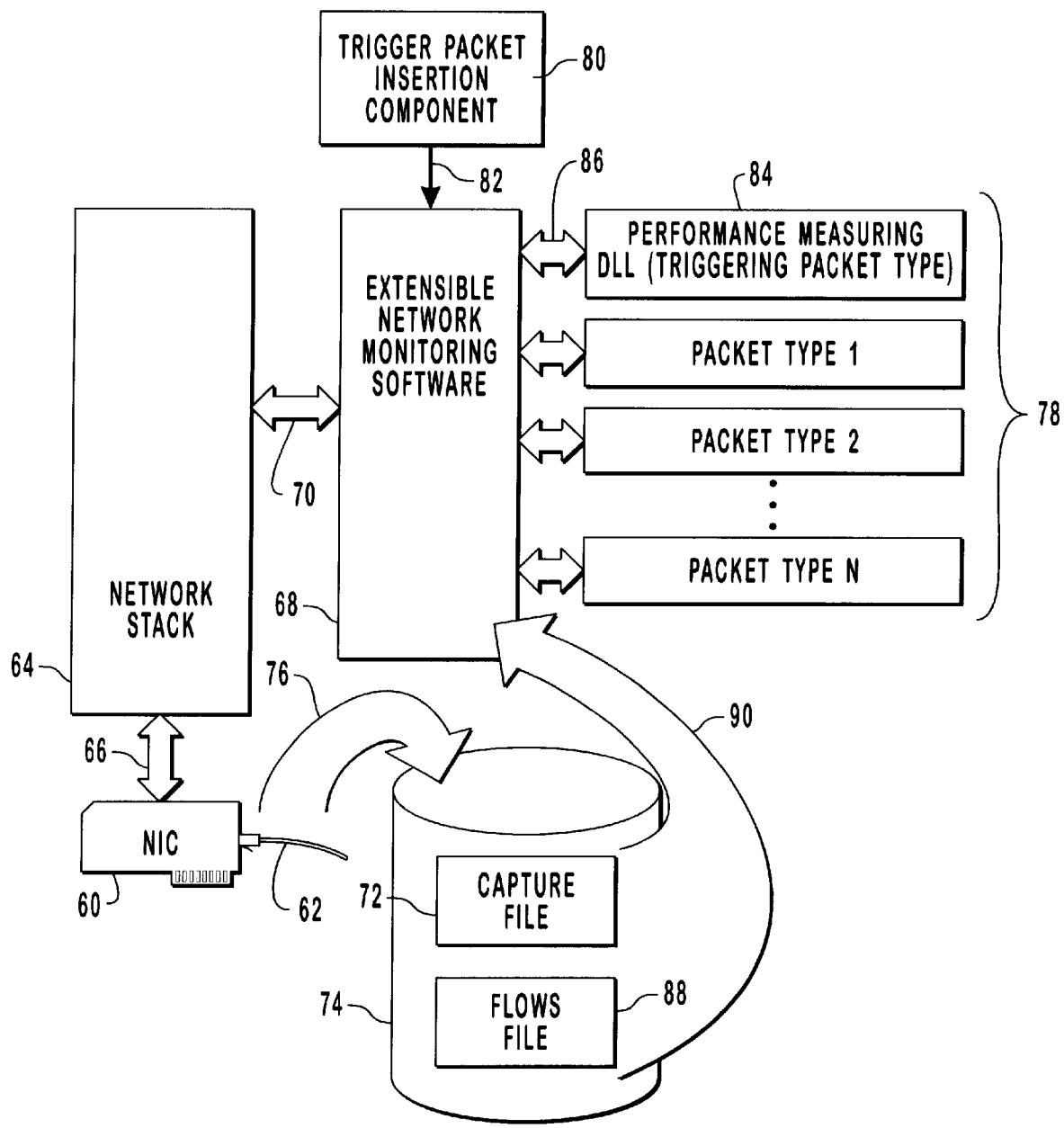
FIG. 2 is a logical block diagram showing extensible network monitoring software as it interacts with the network through the network stack to create a capture file and interpret the capture according to the present invention.

Referring now to FIG. 2, a block diagram showing the different components involved in the present invention is shown. A computer system is hooked to shared media through a network interface card 60 and some form of physical connection 62. The network interface card 60 is controlled by system software collectively known as the network stack 64 as represented by arrow 66.

The network stack 64 includes the I/O subsystem and operating system. It is through the various layers of software that data is transmitted from the network through the network interface card 60 into the network stack 64 and ultimately to an application and vice versa. Note that components of the network stack may reside in both a privileged "kernel" mode of the operating system as well as the standard application space known as "user" mode. The network stack composed of the various I/O subsystems and operating systems are generally known in the art and have various different technical specifications. One exemplary example of an operating system and I/O subsystem acting together as a network stack is the Microsoft NT operating system using kernel mode device drivers operating with the NDIS component to facilitate driver development with application level interfaces, such as WinSock, for doing network communications. In many instances, the I/O subsystem is considered part of the operating system. For purposes of the present invention, only an abstract discussion is necessary and those skilled in the art will apply the present invention to any other network stack regardless of implementation detail.

An essential component is the extensible network monitoring software 68 that interacts with the network stack 64 as indicated by arrow 70. While a number of different packet "sniffing" and other network monitoring tools are available, the present invention capitalizes upon an extensible network monitoring software program 68. In this manner, a generally available tool may be extended to facilitate the added functionality necessary in order to test the performance of a packet scheduler. An extensible network monitoring software program 68 may interact with the network stack 64 in a variety of different ways and in different locations and still be in accordance with the present invention.

The essential element is the ability of the extensible network monitoring software to eventually control the network interface card 60 in such a manner that all packets available on the shared media may be acquired and routed as part of a capture. Such a capture will be stored in a capture file 72 on some form of storage 74, such as a hard disk of a computer system. Performing such capture is represented by arrow 76 illustrating packets going from the network into a capture file 72.

One example of such extensible network monitoring software 72 is the Netmon application generally distributed with the NT operating system by Microsoft. More detailed information regarding the operation of Netmon may be acquired in the NT documentation and associated web sites and is hereby incorporated by reference. As shown in FIG. 2, the extensible network monitoring software 68 is a general representation of which the Netmon software is a specific implementation.

The extensible network monitoring software 68 will perform a capture of all packets for a specified period of time as represented by arrow 76 and as explained previously. This "capture" will contain all packets available on the network (or other shared media) for that period of time and will include those not specifically destined to or originating from the computer system making the capture. This will require the extensible network monitoring software 68 to cause the network interface card 60 to read all packets into the capture.

Once a capture has been made, the extensible network monitoring software 68 will analyze the capture in the capture file 72 and display the results onto the display of the computer system. In order to assist in the interpretation of the different packet types found within a particular capture, extensible modules 78 are used to parse, interpret, and provide packet type specific processing and display. For example, one packet type may be an IP packet type and another may be a IPX packet type, each requiring a different extensible module. This allows all current types of packets to be supported as well as future packets not known when the extensible network monitor software 68 is produced.

In order to determine which of the various extensible modules 78 is appropriate to a given a packet, the extensible network monitoring software 68 will provide identifying information to each extensible module in succession until one of the extensible modules acknowledges that it can properly handle the packet. With respect to the Netmon software used in one preferred embodiment of the present invention, each of extensible modules 78 is a dynamic link library ("DLL").

Referring now to the particulars of the present invention, a trigger packet insertion component 80 interfaces with the extensible network monitoring software 68 (illustrated by arrow 82) in order to place special trigger packets within the capture stored in the capture file 72 as the capture is being made. These trigger packets are inserted periodically in order to have a relevant quantum of time between the triggering packets so that analysis will be taken for all the packets in that quantum. Typically this will be once every two or three seconds during the course of a normal capture.

The trigger insertion component may be implemented in a variety of ways as will be appreciated by one skilled in the art. For one preferred implementation, an application level software program operates an exposed interface of the Netmon software so that the Netmon software will insert the trigger packets at the specified time during the course of a capture. The application level program will allow a user to selectively choose the period in terms of seconds as to when the trigger packets may be inserted.

Note that many other ways for placing the trigger packets into the capture at the appropriate location relative to other packets captured off the network can be achieved. These other ways may be done in a variety of ways and at different times. For example, packets may be introduced into a previously taken capture by looking at the time stamps of the existing capture and placing trigger packets at the appropriate intervals. The important criterion is that the trigger packets be properly placed before the analysis stage is begun by the extensible network monitoring software 68.

The trigger packet itself may be of minimal length and simply needs to be uniquely identified. The purpose of the trigger packet is simply to transfer control to a specific extensible module that will then implement the proper function of the present invention in order to acquire the relevant statistics on a per-flow basis so that the packet scheduler performance may be verified. This is shown in FIG. 2 as a performance measuring DLL 84 that will receive processing control when a triggering packet is encountered during the processing of a capture by the extensible network monitoring software 68. Transfer of control is represented by arrow 86.

A special flows file 88 will be stored on disk 74 and accessed by the performance measuring DLL 84 in order to determine how to collect and assemble the relevant metrics or statistics for the capture. As will be explained in greater detail hereafter, the performance measuring DLL 84 will begin processing at the trigger packet and will move successively forward to the next trigger packet and process all the packets contained therein individually.

At the end of processing, summary statistics on a per-flow basis as determined by reference to the flows file 88 will be displayed as well as statistics on a block basis for all packets between the two triggering packets. The processing done by the performance measuring DLL 84 in conjunction with the extensible network monitoring software 68 and all of the extensible modules 78 is represented by the arrow 90 where the capture file and the flows file are used from the disk 74 in order to make the analysis.

Figure 3:
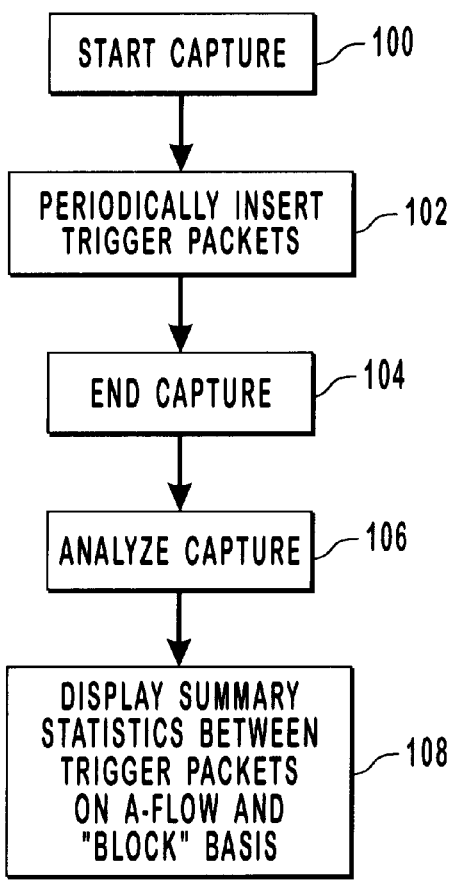
FIG. 3 is a flow chart illustrating the processing steps taken to insert trigger packets into the capture prior to analyzing and displaying the capture.

Referring now to FIG. 3, a flow chart showing the basic steps incorporated in the method of the present invention is shown. This flow chart will be explained in the context of the drawings shown in FIG. 2 and reference will be made to the various components and their operation.

Initially, a capture is started at step 100 by the extensible network monitoring software 68. As explained previously, every packet that is available on the shared media, such as a Ethernet network, is brought through the network interface card 60 into the network stack 64 and eventually into a capture file 72 all under the control and instrumentality of the extensible network monitoring software 68.

While the capture is in progress, trigger packets are inserted periodically at step 102 by the trigger packet insertion component 80. As shown in FIG. 2, the trigger packet insertion component 80 will interface with the extensible network monitoring software 68 to place packets into the capture file 72 in a periodic manner. Such packets are preferably at equal intervals in time so that the analysis will occur for a quantum block of time uniformly between the several triggering packets. Finally, the capture is ended at step 104 and the analysis portion begins at step 106.

Analysis of the capture is done on the computer system without regard to any more activity occurring over the network. As part of the analysis, the extensible network monitoring software 68 will make use of the extensible modules 78 to assist in processing each individual packet based on packet type. The extensible modules 78 will typically be used to parse the packets and cause relevant information to be displayed by the extensible network monitoring software 68. Note below in Table 1, a sample of a potential capture:

TABLE 1

Example Capture for Host 10.13.19.97

| Packet Type | Time Stamp (seconds) | Host:Port Destination | Host:Port Origin | Size (bytes) | Other Information |
|---|---|---|---|---|---|
| Triggering | 0.000 | | | 63 | |
| TCP/IP | 0.077 | 1.2.3.4:5 | 10.13.19.97:817 | 400 | |
| TCP/IP | 0.112 | 7.7.7.7:7 | 10.13.19.97:1215 | 256 | |
| TCP/IP | 0.115 | 8.8.8.8:8 | 10.13.19.97:719 | 256 | |
| TCP/IP | 0.223 | 1.2.3.4:5 | 10.13.19.97:817 | 127 | |
| TCP/IP | 0.444 | 1.2.3.4:5 | 10.13.19.97:817 | 127 | |
| Triggeriing | 1.000 | | | 63 | |
| TCP/IP | 1.223 | 1.2.3.4:5 | 10.13.19.97:817 | 512 | |
| TCP/IP | 1.345 | 7.7.7.7:7 | 10.13.19.97:1215 | 512 | |
| TCP/IP | 1.367 | 8.8.8.8:8 | 10.13.19.97:719 | 256 | |
| TCP/IP | 1.559 | 1.2.3.4:5 | 10.13.19.97:817 | 256 | |
| TCP/IP | 1.666 | 1.2.3.4:5 | 10.13.19.97:817 | 67 | |
| TCP/IP | 1.690 | 7.7.7.7:7 | 10.13.19.97:1215 | 256 | |
| TCP/IP | 1.780 | 7.7.7.7:7 | 10.13.19.97:1215 | 256 | |
| TCP/IP | 1.810 | 7.7.7.7:7 | 10.13.19.97:1215 | 256 | |
| TCP/IP | 1.947 | 8.8.8.8:8 | 10.13.19.97:719 | 256 | |
| Triggering | 2.000 | | | 63 | |
| TCP/IP | 2.045 | 8.8.8.8:8 | 10.13.19.97:719 | 256 | |
| TCP/IP | 2.223 | 8.8.8.8:8 | 10.13.19.97:719 | 256 | |
| TCP/IP | 2.276 | 7.7.7.7:7 | 10.13.19.97:1215 | 256 | |

TABLE 1-continued

Example Capture for Host 10.13.19.97

| Packet Type | Time Stamp (seconds) | Host:Port Destination | Host:Port Origin | Size (bytes) | Other Information |
|---|---|---|---|---|---|
| TCP/IP | 2.345 | 7.7.7.7:7 | 10.13.19.97:1215 | 256 | |
| TCP/IP | 2.401 | 8.8.8.8:8 | 10.13.19.97:719 | 256 | |
| TCP/IP | 2.444 | 7.7.7.7:7 | 10.13.19.97:1215 | 256 | |
| TCP/IP | 2.497 | 1.2.3.4:5 | 10.13.19.97:817 | 512 | |
| TCP/IP | 2.559 | 1.2.3.4:5 | 10.13.19.97:817 | 512 | |
| TCP/IP | 2.605 | 7.7.7.7:7 | 10.13.19.97:1215 | 256 | |
| TCP/IP | 2.700 | 1.2.3.4:5 | 10.13.19.97:817 | 512 | |
| TCP/IP | 2.813 | 1.2.3.4:5 | 10.13.19.97:817 | 512 | |
| TCP/IP | 2.889 | 7.7.7.7:7 | 10.13.19.97:1215 | 256 | |
| Triggering | 3.000 | | | 63 | |
| TCP/IP | 3.678 | 8.8.8.8:8 | 10.13.19.97:719 | 73 | |
| Triggering | 4.000 | | | 63 | |
| Triggering | 5.000 | | | 63 | |

Details as to the analysis of a capture as performed by the performance measuring DLL 84 will be explained hereafter in connection with the flow chart shown in FIG. 4.

Once the analysis is completed, a display of the summary statistics between each of the trigger packets in the capture is shown at step 108 on a per-flow basis and a block basis. The per-flow statistics can be used to ascertain whether a packet scheduler has adequately maintained a bandwidth reservation, for example, or can be used for other performance measuring functions.

Figure 4:
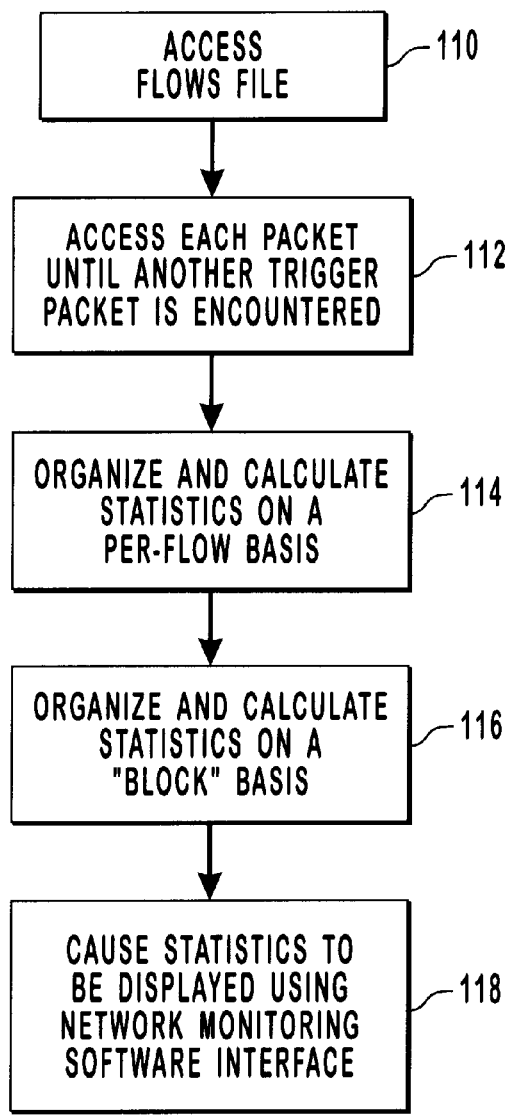
FIG. 4 is a flow chart showing the processing steps taken by a performance processing DLL when a trigger packet is encountered.

Referring now to FIG. 4, more detailed operation of the performance measuring DLL 84 is shown. When a trigger packet is encountered by the extensible network monitoring software 68 as it traverses through the capture file 72, the performance measuring DLL will receive processing control. Initially, the performance measuring DLL 84 will access the flows file 88 at step 110. The flows file 88 defines the different flows for which statistics and metrics will be taken. One preferred embodiment for use on the Internet will define a flow in terms of an IP address, identifying a host system and a port number as a destination for receiving the actual packets. Those skilled in the art will recognize that other ways and means may be used to determine or define a flow. Listed below in Table 2 is an example of a flows file 88 associated with the capture file shown in Table 1.

TABLE 2

Sample Flows File

| Flow Name | Host Address | Port Number |
|---|---|---|
| Flow A | 1.2.3.4 | 5 |
| Flow B | 7.7.7.7 | 7 |
| Flow C | 8.8.8.8 | 8 |

At step 112, the performance measuring DLL 84 will access each packet in the capture sequentially until another trigger packet is encountered. This represents the entire quantum of time between trigger packets and will be used to determine rates and bandwidth calculations. While support may implemented in the extensible network monitoring software 68 to utilize each of the extensible modules 78 to assist in accessing and interpreting each packet for purposes of performance measurement, a currently preferred embodiment solely uses the code of the performance measuring DLL 84 to access the packets within the capture. Therefore, the performance measuring DLL 84 will have knowledge of some rudimentary packet types so that it may correctly access relevant information, such as time stamps, packet size, addressing, etc. for the individual packets.

Next, at step 114, the performance measuring DLL 84 will organize and calculate the statistics on a per-flow basis. Again, as explained previously, this allows the performance of a packet scheduler to be verified. Some of the performance measurements that may be of use depending on implementation and circumstances would include, but not be limited to the following: total actual bandwidth used, percentage of bandwidth used, the "burstiness" or pacing of packets (i.e., time between packets for a particular flow), packet size (e.g., average, largest, smallest), average data rate, peak data rate, etc. Again, these kinds of performance measurements or metrics can be used to ascertain whether a packet scheduler is performing in accordance with certain resource reservations.

Extensible network monitoring software 68 will then organize and calculate statistics on a block basis at step 116. This calculation is done without respect to individual flows so as to generally present an indication of bandwidth utilization and characteristics of the network traffic as if it were in one single flow.

Finally, all the measured statistics and metrics are caused to be displayed at step 188. In a preferred embodiment, all display is handled by the extensible network monitoring software 68. The performance measuring DLL 84 will give instructions over the interface as represented by arrow 86 to cause the measurements to be displayed. This may occur as part of function call exchange where the performance measuring DLL 84 will place only the relevant portions of information to be displayed into a data structure used by the extensible network monitoring software 68 to properly display the desired data. Other embodiments may have the performance measuring DLL 84 directly display any relevant statistics.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In conjunction with an extensible network monitoring software program, said program being capable of capturing a quantity of network packets in sequential time order as a capture of packets, displaying contents of packets, and providing an interface for customized viewing and other processing based on packet type, and having extensible software modules written to the interface provided by the extensible network monitoring software program that provide customized processing and viewing based on packet type, a method utilizing the extensible network monitoring software for assessing the performance of a packet scheduler, the method comprising:

at a node of a network, performing a capture of packets that are transferred between nodes of the network;

periodically inserting a triggering packet into the capture so as to define a quantum of time between successive triggering packets;

analyzing the packets of the capture by performing the steps of:

in response to the network monitoring software program encountering one of the triggering packets, transferring processing control to a triggering software module pertinent to the triggering packet type; and said triggering software module processing other packets positioned in the capture during the quantum of time between said encountered triggering packet and a next triggering packet to measure performance of said packet scheduler.

2. A method as recited in claim 1 wherein the triggering packet is inserted into the capture while the capture is being made.

3. A method as recited in claim 1 wherein the act of said triggering software module processing other packets positioned in the capture is performed so as to measure performance of said packet scheduler on a per-flow basis.

4. A method as recited in claim 1, further comprising the act of receiving user input specifying the duration of the quantum of time.

5. A method as recited in claim 1, wherein the measured performance of the packet scheduler includes total actual bandwidth used by the packet scheduler.

6. A method as recited in claim 1, wherein the measured performance of the packet scheduler includes a percentage of allocated bandwidth used by the packet scheduler.

7. In a system comprising a plurality of networked computers, at least one of which comprises a packet scheduler that transmits packets on different flows to other computers, and at least one of which comprises network monitoring software, a method of measuring the performance of the packet scheduler comprising at least the steps of:

initiating a capture of packets using the network monitoring software wherein packets transferred on the network are captured for later analysis and review;

periodically inserting into the capture triggering packets that are not transferred on the network from one computer to another, so as to define a quantum of time between successive triggering packets;

analyzing the packets of the capture by performing at least the steps of:

by the network monitoring software, encountering a triggering packet; and in response to the encountered triggering packet, transferring processing control to a triggering software module pertinent to the triggering packet type, which then, for each packet between the current triggering packet and the next triggering packet 1) decodes at least some of the information in the packet, 2) collects statistics on the packet, and 3) after all packets between the current triggering packet and the next triggering packet have been decoded and statistics collected, then displays a summary of the collected statistics.

8. A method as recited in claim 7, further comprising the act of displaying a summary of collected statistics that is organized on a per-flow basis.

9. A method as recited in claim 7, further comprising the act of receiving user input specifying the duration of the quantum of time.

10. A computer program product for use with an extensible network monitoring software program having an interface for computer program products and capable of storing a sequential quantity of packets in a capture of packets, said computer program product processing network packets in a captured quantity of network packets in order to display information regarding the performance of a packet scheduler on the extensible network monitoring software program by interacting with the provided interface, the computer program product comprising:

a computer-readable medium; and computer-executable instructions contained on said computer-readable medium for performing the steps of:

receiving execution control from the extensible network monitoring software program in response to the extensible network monitoring software program encountering a triggering packet that has been inserted into the capture;

processing network packets that have been included in the capture during a quantum of time that is defined by said encountered triggering packet and a next triggering packet that has been inserted into the capture in order to create performance statistics for the packet scheduler; and interacting with the interface provided by the extensible network monitoring software program in order to display the performance statistics.

11. A computer program product as recited in claim 10 wherein the processing of network packets provides performance statistics on a per-flow basis.

12. A system for analyzing the performance of a packet scheduler comprising:

an extensible network monitoring software program for initiating and completing a capture of packets, said program having an interface for extensible modules that interpret a packet and give information for causing said program to display information;

a triggering packet insertion component that periodically inserts triggering packets into the capture; and a triggering packet module that interacts with the extensible network monitoring software program as an extensible module over the provided interface, and for each packet between a current triggering packet and a next triggering packet the triggering packet module 1) decodes at least some of the information in the packet, 2) collects statistics on the packet, and 3) after all packets between the current triggering packet and the next triggering packet have been decoded and statistics collected, then displays a summary of the collected statistics.

13. A system as recited in claim 12 wherein the triggering packets are inserted while the network packets are being captured.

14. A system as recited in claim 12 wherein the triggering packets are inserted after the network packets are captured.

15. A method as recited in claim 12, further comprising means for transferring control from the extensible network monitoring software program to the triggering packet module in response to the extensible network monitoring software program encountering one of the triggering packets that have been inserted into the capture.

* * * * *

UNITED STATES PATENT AND TRADEMARK OFFICE
CERTIFICATE OF CORRECTION

PATENT NO. : 6,173,325 B1 Page 1 of 1
DATED : January 31, 2001
INVENTOR(S) : Sachin Kukreji It is certified that error appears in the above-identified patent and that said Letters Patent is hereby corrected as shown below:

Title page,
Item [54], Title, after "PERFORMANCE OF A PACKET" change "SCHEDULE" to -- SCHEDULER --

Column 5,
Line 9, before "unique placeholder" change "a" to -- an --
Line 52, before "system memory" change "the" to -- The --

Column 8,
Line 2, before "IPX packet type" change "a" to -- an --
Line 7, before "packet," delete "a"

Column 9,
Line 15, before "Ethernet network" change "a" to -- an --

Column 10,
Line 64, before "implemented" insert -- be --

Signed and Sealed this

Nineteenth Day of July, 2005

JON W. DUDAS
*Director of the United States Patent and Trademark Office*